Jan. 1, 1935.  F. SCHMIDT  1,986,539
FORCED LUBRICATION SYSTEM
Filed May 11, 1931   2 Sheets-Sheet 1

Inventor:
Fritz Schmidt
By [signature]
Attorney

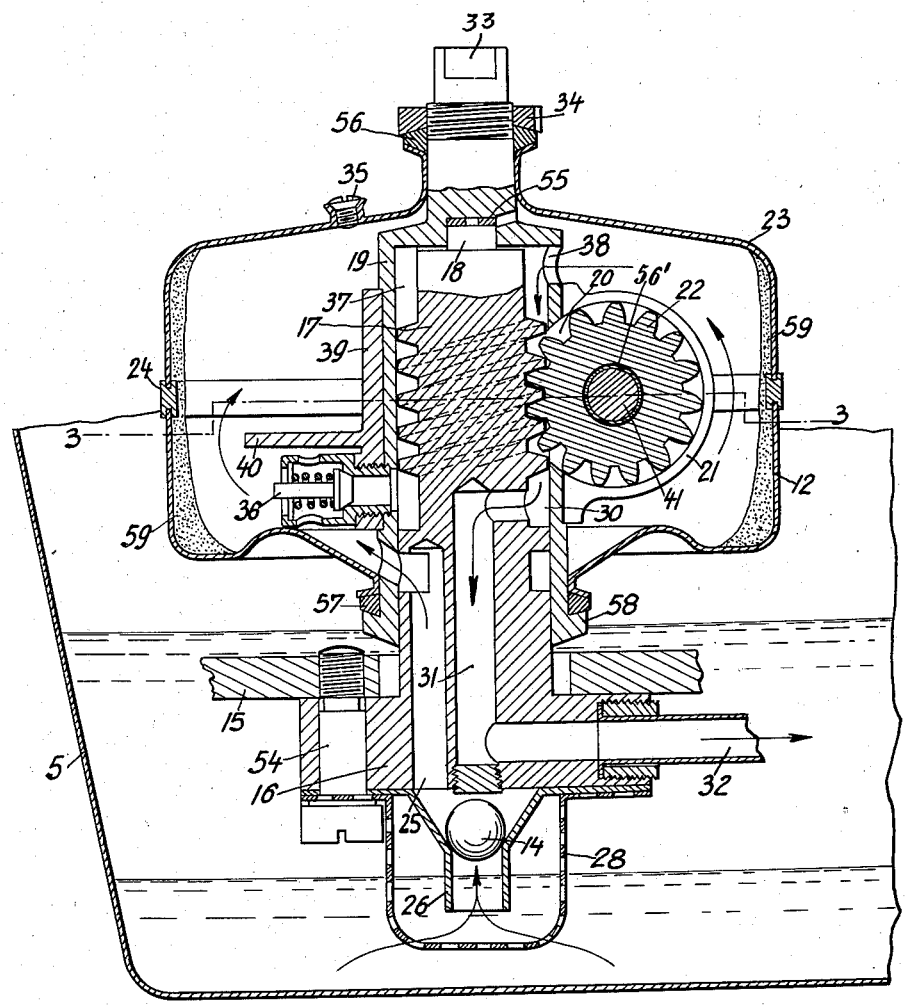

Patented Jan. 1, 1935

1,986,539

UNITED STATES PATENT OFFICE 1,986,539

FORCED-LUBRICATION SYSTEM

Fritz Schmidt, Potsdam, Germany

Application May 11, 1931, Serial No. 536,538
In Germany May 20, 1930

8 Claims. (Cl. 184—6)

My invention relates to forced-lubrication systems and is particularly suitable for, though not limited to, the engines of power-driven vehicles.

It is an object of my invention to provide improved means for purifying the oil, and to this end I arrange a centrifugal purifier on the suction side of the oil pump in the system.

In systems of the type referred to the oil after having lubricated the various lubricating stations is returned to a reservoir or sump, with the impurities it carries, such as particles of metal, coke, and sand. On account of the vibrations to which the engine is subjected, particularly in motor vehicles, the impurities cannot settle in the sump but are entrained by the circulating oil, causing wear of bearings and reducing the life of the engine.

It has been suggested to provide oil filters but such must not be arranged in the principal flow of the oil because if they get clogged the engine may run without oil altogether. Filters are therefore arranged in a shunt to the principal flow which removes the risk to the engine but permits only a very small percentage of the oil to be filtered.

Besides, filters will never thoroughly remove the impurities, the only efficient means being centrifugal drums. Such drums have already been arranged independently of the pumps but have never been adopted on account of certain defects.

According to my invention, with the centrifugal purifier arranged in the oil flow, and preferably, immediately ahead of the pump, the oil is thoroughly cleaned and the oil pump protected from foreign substances. Absolute reliability not only of the lubrication system but also of the engine, is obtained.

The system is simple and cheap and therefore particularly suitable for series production in connection with motor-car engines.

The impurities separated from the oil are collected in the centrifugal casing and must be drained from time to time. Even if this is neglected the device will never become clogged to such an extent that the circulation is interrupted and the engine endangered.

In the accompanying drawings two types of pumps embodying my invention are illustrated by way of example.

In the drawings

Fig. 2 is a sectional elevation taken on the line 2—2 in Fig. 3, and

Figure 1:
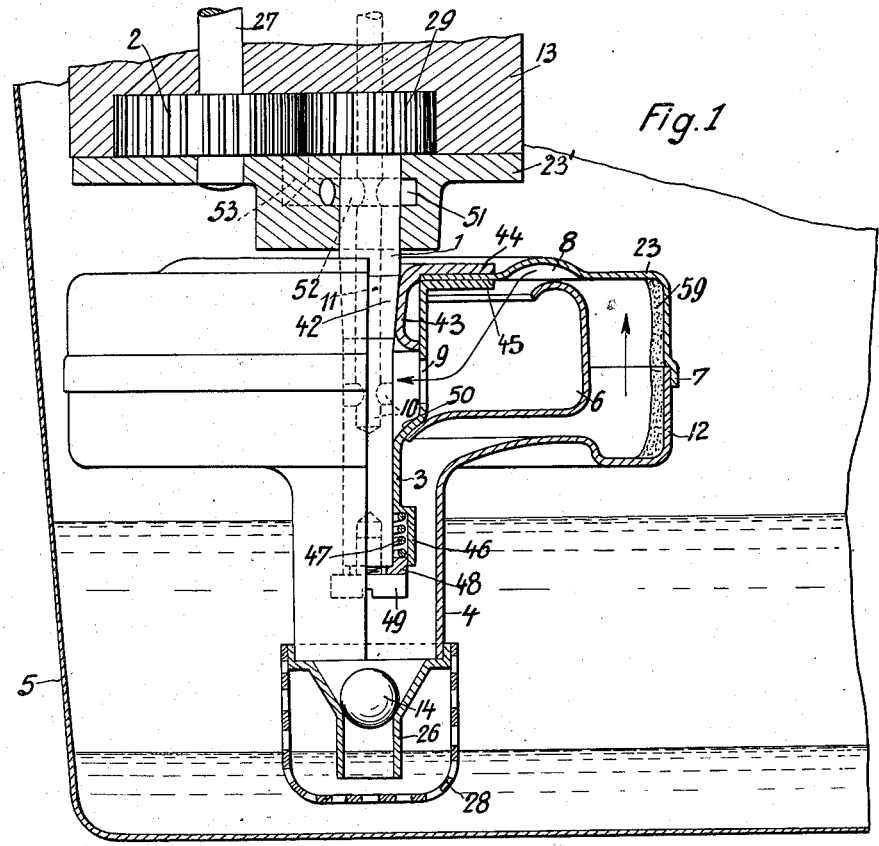
Fig. 1 is partly an elevation, and partly an axial section, of a purifier combined with a normal gear pump.

Referring now to the drawings, 5 is an oil reservoir or sump, 12 is the base portion, 23 is the top portion of the purifier, 14 is the suction valve of the pump, 26 is its cage, and 28 is a perforated screen surrounding the valve cage.

Referring now particularly to Fig. 1, 13 is the casing of the pump, 23' is its bottom plate, 27 is the driving, and 1 is the driven shaft of the pump, with the gear wheels or pistons 2 and 29 secured on the respective shafts. 42 is a tapered seat on the shaft 1, 43 is a sleeve on the seat, with a horizontal flange 44 at its upper end, 3 is another sleeve which is mounted to slide on the parallel lower portion of the shaft 1, with its upper end enlarged for the reception of the flanged lower end of the sleeve 43, and 45 is a flange at the upper end of the sleeve 3. Held between the flanges 44 and 45 is the top plate of the upper purifier portion 23 which is dished out at 8, and pressure is exerted on the lower flange 45 by a spring 47 in a casing 46 at the lower end of the shaft 1, with a washer 48 and a screw 49 in the shaft for holding the washer down on the spring 47. The lower purifier portion 12 is spigoted in the upper portion at 7, and 4 is a suction pipe which extends downwardly from the bottom of the portion 12, with the valve cage 26 at its lower end, the lower end of the cage extending below the lowest level of oil in the sump 5. 50 is a shoulder at the lower end of the enlarged portion of sleeve 3, and 6 is an inner purifier casing the bottom of which is seated on the shoulder 50. The casing 6 is open at the top and curved in conformity with the dished-out portion 8 of the top plate at its upper edge, and 9 is a hole in the enlarged portion of the sleeve 3 which is connected to the casing 6.

11 is an axial bore in the shaft 1, and 10 are radial passages connecting the bore to the interior of the enlarged sleeve portion. 51 is a groove in the bottom plate 23' of the pump 13 which surrounds the shaft 1, 52 are radial passages connecting the bore 11 to the groove 51, and 53 is a passage extending from the groove to the space intermediate the gear wheels 2 and 29.

Rotation is imparted to the shaft 27 by any suitable means, not shown, and transmitted to the shaft 1. Oil is drawn into the purifier past suction valve 14, rises above the top of the inner casing 6 through the dished-out portion 8, flows down to the hole 9 as indicated by the arrows, and finally rises to the passage 53 through the bore 11 and its radial passages 10 and 52. The oil rotates with the purifier 23, 12, and its impurities are hurled toward the vertical wall of the purifier where they form a layer 59. Vanes, not shown, may be provided in the purifier for entraining the oil. The volume of the purifier is so large that a considerable quantity of impurities may collect at 59 without interfering with the flow of the oil to the pump. Of course the purifier should be cleaned periodically but there will be no trouble if this is neglected for a long time.

The suction valve 14 is not indispensible but is preferably provided for keeping the oil in the pump when the sump 5 is drained.

Figure 3:
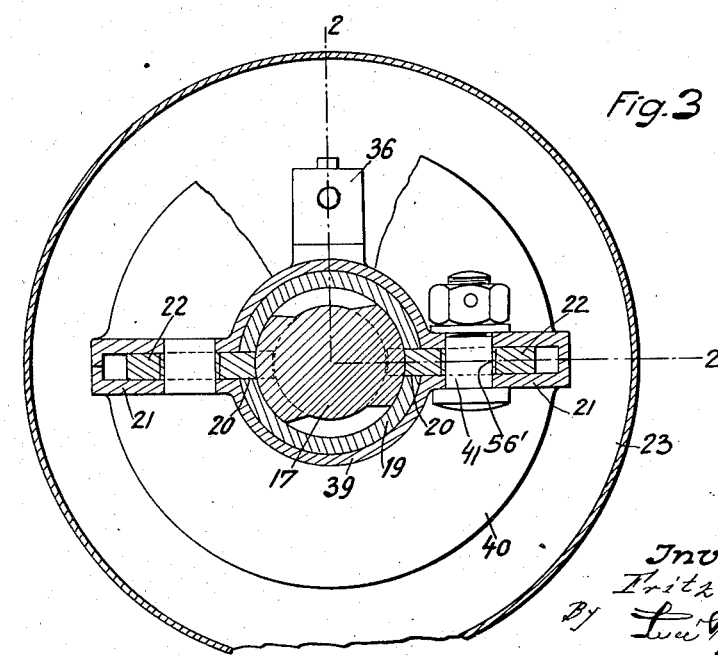
Fig. 3 is a section on the line 3—3 in Fig. 2, showing a gear pump with a worm gear as the pumping member.

Referring now to Figs. 2 and 3, 15 is a bearing plate, with a hole in its centre, 16 is a bracket which is held to the lower face of the plate by screws 54, and 17 is a worm extending upwards from the bracket. 18 is a pin at the upper end of the worm 17, 55 is a washer on top of the pin, and 33 is the partly hollow shaft of the pump which is equipped with a step bearing for the pin 18. The hollow portion 19 of the shaft makes a tight fit on the crests of the worm thread. Secured on the hollow portion 19 is a divided sleeve or boss 39 with a pair of lateral extensions on both sides which make up two casings 21, and 40 is a centrifugal disc which is also divided and cast integral with the halves of the boss and the casings. 22 are worm wheels in the casings 21 which are mounted to rotate on bushings 56' surrounding pins 41.

The portions 12 and 23 of the purifier are mounted respectively on a shoulder 58 at the lower end of the hollow shaft extension 19 and on the solid upper end of the shaft 33, with packing washers 56 and 57 above and below, and a threaded annulus 34 for holding the upper washer 56 down on the neck of the upper portion 23, 24 is a grooved ring for the reception of the edges of 23 and 12, and 35 is a filling plug.

37 is the suction, and 30 is the delivery chamber of the pump, both enclosed by the hollow shaft extension 19. 25 is a suction passage in the stem of the worm 17 which opens into the purifier at its bottom, and 38 is a hole near the upper end of the extension 19. The oil is drawn into the pump as indicated by the arrows, and forced into the delivery chamber 30. Connected to the delivery chamber is a passage 31, also in the stem of the worm 17, to which is connected the delivery pipe 32. 36 is a relief valve connected to the delivery chamber 30. The same means which rotates the centrifugal in Fig. 2 may also rotate the pump.

In operation the worm wheels 22 rotate bodily about the axis of the shaft 33 with their casing 21 and at the same time are rotated by meshing with the worm 17. The oil is forced from 37 to 30, and finally discharged through 32. In flowing from the upper end of the suction passage 25 to the opening 38 the oil flows past the disc 40 and the casings 21 by which the centrifugal action of the purifier is assisted. The impurities collect at 59 and are removed periodically but, as in the pump Fig. 1, neglect will not cause trouble immediately.

The relief valve 36 is provided for the following reason:

The size of the pump must be such that it will supply oil enough if the oil is hot, and the increased consumption with increasing wear of the bearings etc. must also be considered. On the other hand the pressure might become too high under normal conditions and with cold oil. The valve 36 takes care of the excess pressure. The oil from the relief valve 36 does not return to the sump 5 but remains in the purifier so that the oil in the sump is not stirred. The oil from the relief valve is subjected to centrifugal action again and returned to the pump at 38. The oil which flows to the pump from the sump 5 is only so much as required at the bearings for maintaining the predetermined oil pressure in the system.

As compared with the pump Fig. 1 the pump Figs. 2 and 3 has the advantage that the oil enters a stationary member for here the cage 26 of the suction valve 14 is fixed and does not rotate with the purifier as in the case of Fig. 1. The pump Figs. 2 and 3 may therefore also be disposed at a point remote from, or outside, the crank case of the engine, and connected to the sump by a pipe at the end of cage 26.

I am not limited to any particular field in the application of my invention which may be adapted wherever it is desirable that a pump, and the stations it supplies, should be kept clean.

I claim:

1. In a forced-lubrication system, an oil pump, a suction and a delivery conduit connected to said pump, a pump shaft, a centrifugal purifier on said shaft, an outer casing forming part of said purifier, a suction pipe connected to said outer casing and said suction conduit, and an inner casing connected to said outer casing and said delivery conduit.

2. In a forced-lubrication system, an oil pump, a suction and a delivery conduit connected to said pump, a centrifugal purifier on the suction side of said pump, means for rotating said purifier, and pumping members in said purifier which are adapted to rotate bodily therewith.

3. In a forced-lubrication system, an oil pump, a suction and a delivery conduit connected to said pump, a centrifugal purifier on the suction side of said pump, means for rotating said purifier, pumping members in said purifier, means for rotating said members bodily with said purifier, and means fixed with respect to said purifier for rotating said members about their own axes.

4. In a forced-lubrication system, an oil pump, a suction and a delivery conduit connected to said pump, a centrifugal purifier on the suction side of said pump, a hollow shaft forming part of said conduits, on which shaft said purifier is secured, and a fixed member forming the suction and delivery chambers of said pump with said hollow shaft.

5. In a forced-lubrication system, an oil pump including a fixed worm, a cylinder mounted to rotate on said worm and making a tight fit with the crests, a casing on said cylinder, a worm wheel in said casing in mesh with said worm, means for rotating said cylinder about the axis of said worm, and a purifier on the suction side of said pump mounted to rotate with said cylinder and surrounding said casing.

6. In a forced-lubrication system, an oil pump including a fixed worm having a suction and a delivery conduit, a cylinder mounted to rotate on said worm, making a tight fit with its crests and connected to said conduits, a casing on said cylinder, a worm wheel in said casing in mesh with said worm, means for rotating said cylinder about the axis of said worm, and a purifier intermediate said suction and delivery conduits mounted to rotate with said cylinder and surrounding said casing.

7. In a forced-lubrication system, an oil pump having a rotating member, means for operating the rotating member, a suction and a delivery conduit connected to said pump, a centrifugal purifier, rotating about an axis of a member of said pump and connecting with said rotating member of the pump, a casing forming part of said purifier and being closed circumferentially, means for connecting said casing near its centre to a suction pipe, and means for connecting an opposite part of the casing to said suction conduit of the pump.

8. In a forced-lubrication system, an oil pump, a suction and a delivery conduit connected to said pump, a centrifugal purifier on the suction side of said pump, means for rotating said purifier, pumping members in said purifier which are adapted to rotate bodily therewith, and a relief valve connected to said delivery conduit and opening into said purifier.

FRITZ SCHMIDT.